(12) United States Patent  
Era et al.

(10) Patent No.: US 7,800,016 B2
(45) Date of Patent: Sep. 21, 2010

(54) POLARITY SWITCHING SHORT CIRCUITING ARC WELDING METHOD

(75) Inventors: Tetsuo Era, Kashiwara (JP); Hiroyasu Mondori, Itami (JP)

(73) Assignee: DAIHEN Corporation, Osaka (JP)

( * ) Notice: Subject to any disclaimer, the term of this patent is extended or adjusted under 35 U.S.C. 154(b) by 629 days.

(21) Appl. No.: 11/224,528

(22) Filed: Sep. 12, 2005

(65) Prior Publication Data

US 2006/0102695 A1 May 18, 2006

(30) Foreign Application Priority Data

Nov. 17, 2004 (JP) ............................. 2004-332558

(51) Int. Cl.
*B23K 9/10* (2006.01)
(52) U.S. Cl. ............................. 219/130.21; 219/130.51; 219/137 PS
(58) Field of Classification Search ............ 219/130.21, 219/130.51, 137 PS
See application file for complete search history.

(56) References Cited

U.S. PATENT DOCUMENTS 4,877,941 A * 10/1989 Honma et al. .......... 219/130.21

FOREIGN PATENT DOCUMENTS

| JP | 58-38664 | 3/1983 |
| JP | 63-157765 | 6/1988 |
| JP | 8-300156 | 11/1996 |

* cited by examiner

*Primary Examiner*—Tu B Hoang
*Assistant Examiner*—Brian Jennison
(74) *Attorney, Agent, or Firm*—Hamre, Schumann, Mueller & Larson, P.C.

(57) ABSTRACT

A method of performing polarity switching short circuiting arc welding is provided. In the arc welding, a welding wire is fed at a constant feeding rate, a short circuiting state and a arcing state appear repeatedly between the welding wire and a base metal, and the output polarity of a welding power source is switched in accordance with a polarity switching signal for performing electrode positive welding and electrode negative welding. In accordance with the method, the welding current is reduced during a predetermined short circuit initial period, when a first arc is formed after the polarity switching signal changes. Then, the output polarity of the welding power source is changed when the short circuit initial period has lapsed. Further, the welding current is increased for terminating the arc forming between the welding wire and the base metal.

2 Claims, 6 Drawing Sheets

POLARITY SWITCHING SHORT CIRCUITING ARC WELDING METHOD

BACKGROUND OF THE INVENTION

1. Field of the Invention

The present invention relates to a polarity switching short circuiting arc welding method for ensuring efficient switching between electrode positive welding and electrode negative welding during a welding operation.

2. Description of the Related Art

In consumable electrode short circuiting arc welding, a consumable electrode provided by a welding wire is supplied at a constant rate and the welding proceeds in a repeated cycle of an arcing stage and a short circuiting stage between the welding wire and the base metal. The category of short circuiting arc welding includes $CO_2$ welding, MAG welding, MIG welding, etc. which use a medium or low range electric current. In the short circuiting arc welding, normally, the welding is made in electrode positive polarity in which the wire serves as a positive electrode while the base metal serves as a negative electrode. However, when a work is thin and has a large gap, the welding may be made in electrode negative polarity in which the welding wire serves as a negative electrode while the base metal serves as a positive electrode. Electrode positive welding enables deep penetration and stable welding over the entire range of electric current. On the other hand, electrode negative welding enables to reduce heat input in the base metal as well as to increase the amount of molten wire. For this reason, it is possible to achieve a high level of quality in the welding of sheet plate works spaced at a large gap. For both polarities, a constant voltage power source is used.

Switching the output polarities of the welding power source not during welding but while welding is stopped can be made by providing a switching element or a mechanical switch in the welding power source output circuit. Since no welding is going on, the polarities may be switched at any timing. On the other hand, if the polarities are to be switched during welding, many arrangements must be made as will be described here below. Switching the polarities during welding enables to achieve higher welding qualities when work's joints and thickness change along the welding line. In such a case therefore, there will be several times of polarity change during a single cycle of welding. When switching polarities during welding, if the switching is made during an arcing stage, the switching will cause an arc extinction, which results in a defective welding. In order to prevent this arc extinction, a high voltage of about a few hundreds of volts must be applied at the time of the polarity switching. The circuit for this high voltage application has a problem that it is complex, and so expensive, as well as large. In order to solve this problem in short circuiting arc welding, there is a prior art disclosed in JP-A-S58-38664 to be described below. This prior art makes sure that polarity switching during welding is made in a short circuiting stage. Because the switching is made out of the arcing stage, there is no problem of arc extinction, and therefore there is no need for the arc re-striking circuit. Hereinafter, this conventional technique will be outlined with reference to a drawing.

FIG. 5 is a voltage-current waveform chart in conventional polarity switching short circuiting arc welding. Part (A) of the figure shows a polarity switching signal Sa, part (B) of the figure shows a polarity switching start signal Sb, part (C) of the figure shows a welding voltage v which is a voltage between the welding wire and the base metal, and part (D) of the figure shows a welding current i which passes through the arcing/short circuiting load, respectively in the form of time course changes. In this figure, a symbol EP indicates electrode positive polarity whereas a symbol EN indicates electrode negative polarity. Hereinafter, description will be made with reference to this figure.

During a short circuiting period Ts, as shown in part (C) of the figure, the welding voltage v takes a short circuiting voltage value of around several volts, and as shown in part (D) of the figure, the welding current i increases gradually. Following this, during an arcing period Ta, as shown in part (C) of the figure, the welding voltage v takes an arc voltage value of around a few tens of volts, and as shown in part (D) of the figure, the welding current i reduces gradually. The above-described state is generally the same whether in the electrode positive polarity EP or the electrode negative polarity EN.

At a time t1, as shown in part (A) of the figure, the polarity switching signal Sa changes. In response to this, as shown in part (B) of the figure, the polarity switching start signal Sb changes at a time t3 which is after the first short circuit occurred at a time t2 after the time t1. In response to this, the welding voltage v shown in part (C) of the figure and the welding current i shown in part (D) of the figure switch from electrode positive polarity EP to electrode negative polarity EN. In the prior art, polarity switching is made during the short circuiting period, but nothing is specified as to the timing of switching during the short circuiting period.

According to the prior art, polarity switching is made at the time t3 during the short circuiting period as shown in FIG. 5, and therefore, it is possible to prevent arc extinction without an arc re-striking circuit. However, as shown in part (D) of the figure, the current value ip at the polarity switching time t3 is as high as a few hundreds of amperes. Since this large current value ip is cut quickly by a switching element or the polarity switching, the switching element is subject to a very large surge voltage exceeding 500 V. In order to protect the switching element from this surge voltage, a special surge voltage protection circuit is necessary, and since the surge voltage protection circuit uses expensive parts, there is a problem that it increases the price of welding power source.

FIG. 6 is a voltage-current waveform chart showing a polarity switching which is made at a time point t2 when the first short circuiting occurs after the polarity switching signal Sa has changed. The figure corresponds to the above-described FIG. 5, differing only in the operation after the time t2. Hereinafter, description will be given for an operation after the time t2.

At the time t2, when polarity switching start signal Sb changes simultaneously with the occurrence of the short circuiting as shown in part (B) of the figure, a polarity switching operation starts. If the short circuit opens incidentally and an arc re-strikes at this moment, as shown in part (C) of the figure, the welding voltage v increases from the short circuiting voltage value to the arc voltage value. Since the polarity switching proceeds in this arcing stage, an arc extinction occurs, and as shown in part (C) of the figure, the welding voltage v becomes a no-load voltage. Thus, as shown in part (D) of the figure, the welding current i ceases. Right after the short circuiting, the current value at polarity switching moment ip is so small that the surge voltage is small. However, the short circuiting stage right after the short circuiting is not yet firmly established, and so the arc is likely to re-strike. There is no consistency as to the timing of arc re-striking during the short circuiting period, so arc can re-strike in the polarity switching in FIG. 5. If polarity switching is made when arc is re-striking, there is a high probability for arc extinction unless the system is provided with an arc re-striking circuit. As has been described, technical challenges in the prior art includes reduction of surge voltage incidence and arc extinction incidence accompanied by arc re-striking during polarity switching, without providing an arc re-striking circuit or a large capacity surge protection circuit.

SUMMARY OF THE INVENTION

The present invention has been proposed under the circumstances described above. It is therefore an object of the present invention to provide a polarity switching short circuiting arc welding method capable of overcoming the above-described conventional problems.

According to the present invention, there is provided a method of performing polarity switching short circuiting arc welding. In this welding, a welding wire is fed at a constant feeding rate, a short circuiting state and an arcing state appear repeatedly between the welding wire and a base metal, and the output polarity of a welding power source is switched in accordance with a polarity switching signal for performing electrode positive welding and electrode negative welding. The method of the present invention comprises the steps of: reducing a welding current during a predetermined short circuit initial period, when a first arc is formed after the polarity switching signal changes; changing the output polarity of the welding power source upon lapsing of the short circuit initial period; and increasing the welding current for terminating the first arc.

Preferably, the short circuit initial period may be determined in accordance with at least one of the output polarity of the welding power source, the feeding rate of the welding wire, the type of the welding wire, and the type of shielding gas.

Preferably, the polarity switching signal may be changed for reversing the output polarity of the welding power source upon lapsing of a predetermined start initial period after an arc forms.

According to the present invention, a welding current is reduced to a low value during a predetermined short circuit initial period which begins upon the first short circuiting after the polarity switching signal changes. The polarity is changed upon lapse of the short circuit initial period, so it is possible to switch the polarities at a properly established short circuiting stage. This eliminates arc extinction caused by arc re-striking during polarity switching. Further, since the current is low, a resulting surge voltage is also low. As a result, there is no need for arc re-striking circuit in order to prevent the arc extinction or need for a high capacity surge voltage protection circuit in order protect polarity switching elements from the surge voltage. Thus, it becomes possible to improve welding quality and to reduce cost of the welding power source.

Further, the present invention can offer another advantage. By appropriately setting the short circuit initial period in accordance with at least one of the output polarity of the power source, the wire feeding rate, the type of welding wire and the type of shielding gas, it becomes possible to switch the polarities when the short circuiting stage has become a more reliably established short circuiting stage. Therefore, it is possible to maximize the effect of preventing arc extinction and reducing surge voltage.

Still further, the output polarity can be changed upon lapse of a predetermined arc start initial period after an art start. This invention is applicable to electrode positive welding or electrode negative welding in which better welding quality can be attained by using the other polarity at the time of arc start.

DETAILED DESCRIPTION OF THE PREFERRED EMBODIMENTS

Preferred embodiments of the present invention will be described below with reference to the accompanying drawings.

Figure 1:
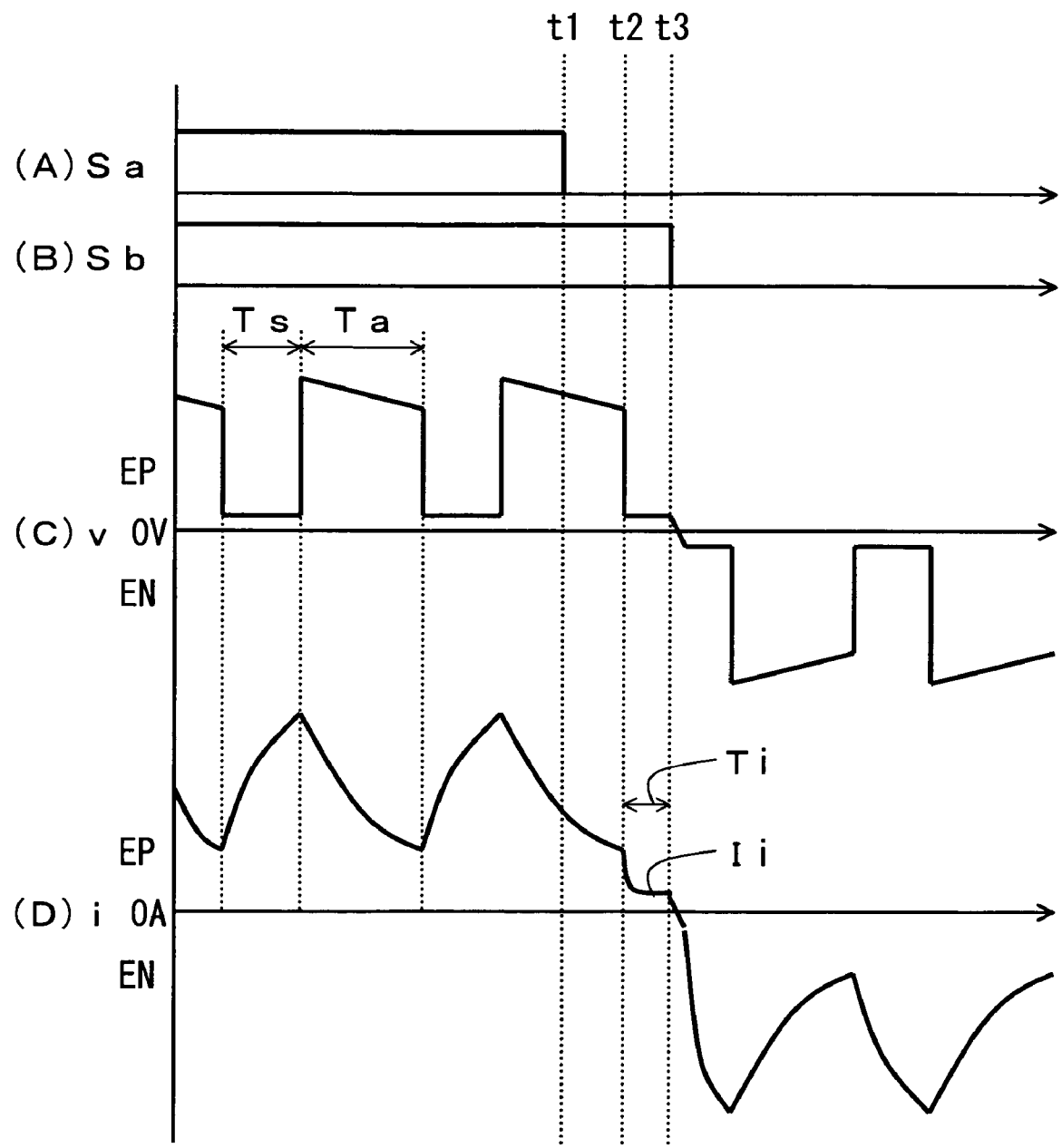
FIG. 1 is a voltage-current waveform chart illustrating a polarity switching short circuiting arc welding method according to a first embodiment of the present invention.
Figure 5:
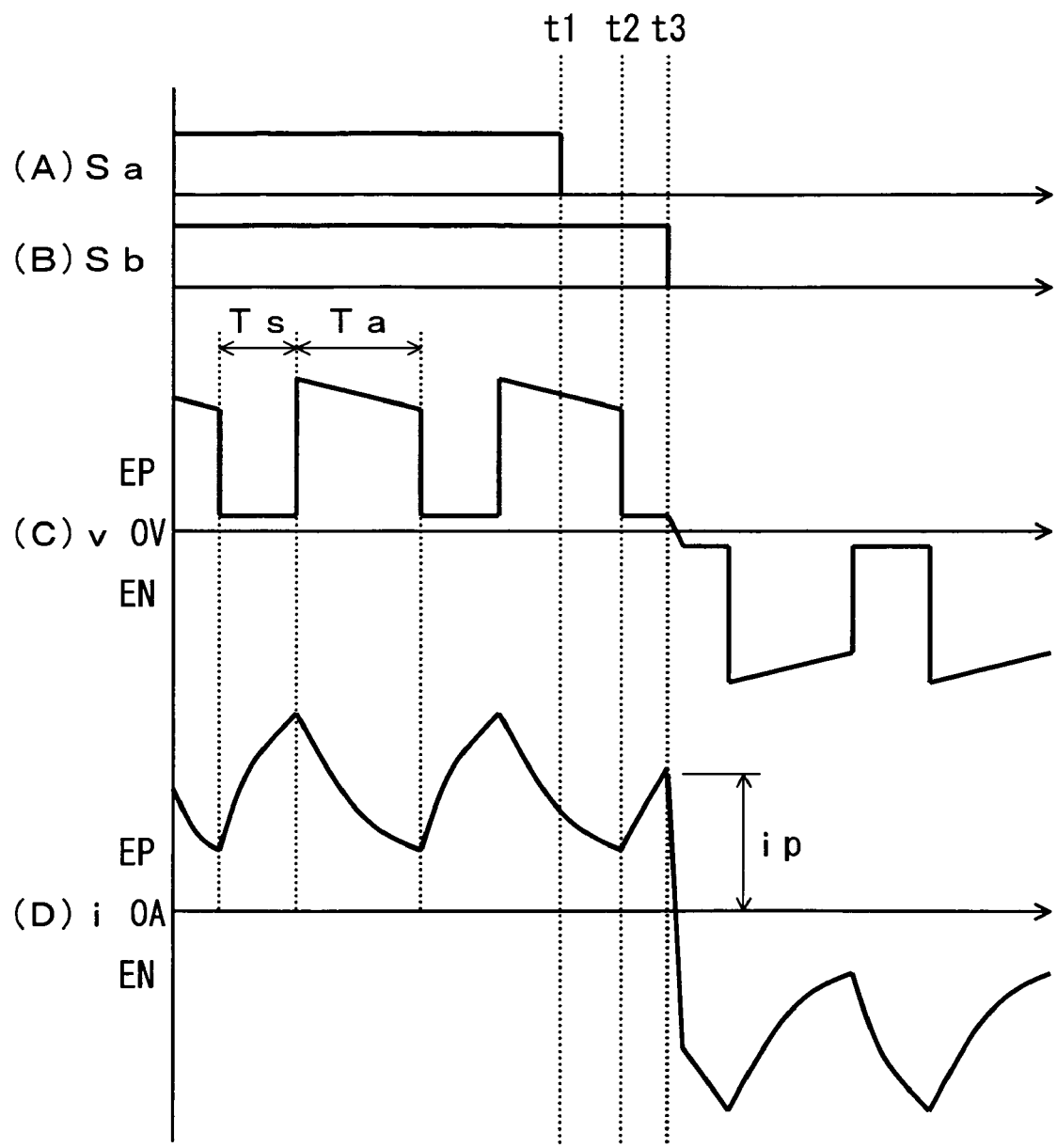
FIG. 5 is a voltage-current waveform chart illustrating a conventional polarity switching short circuiting arc welding method.
Figure 6:
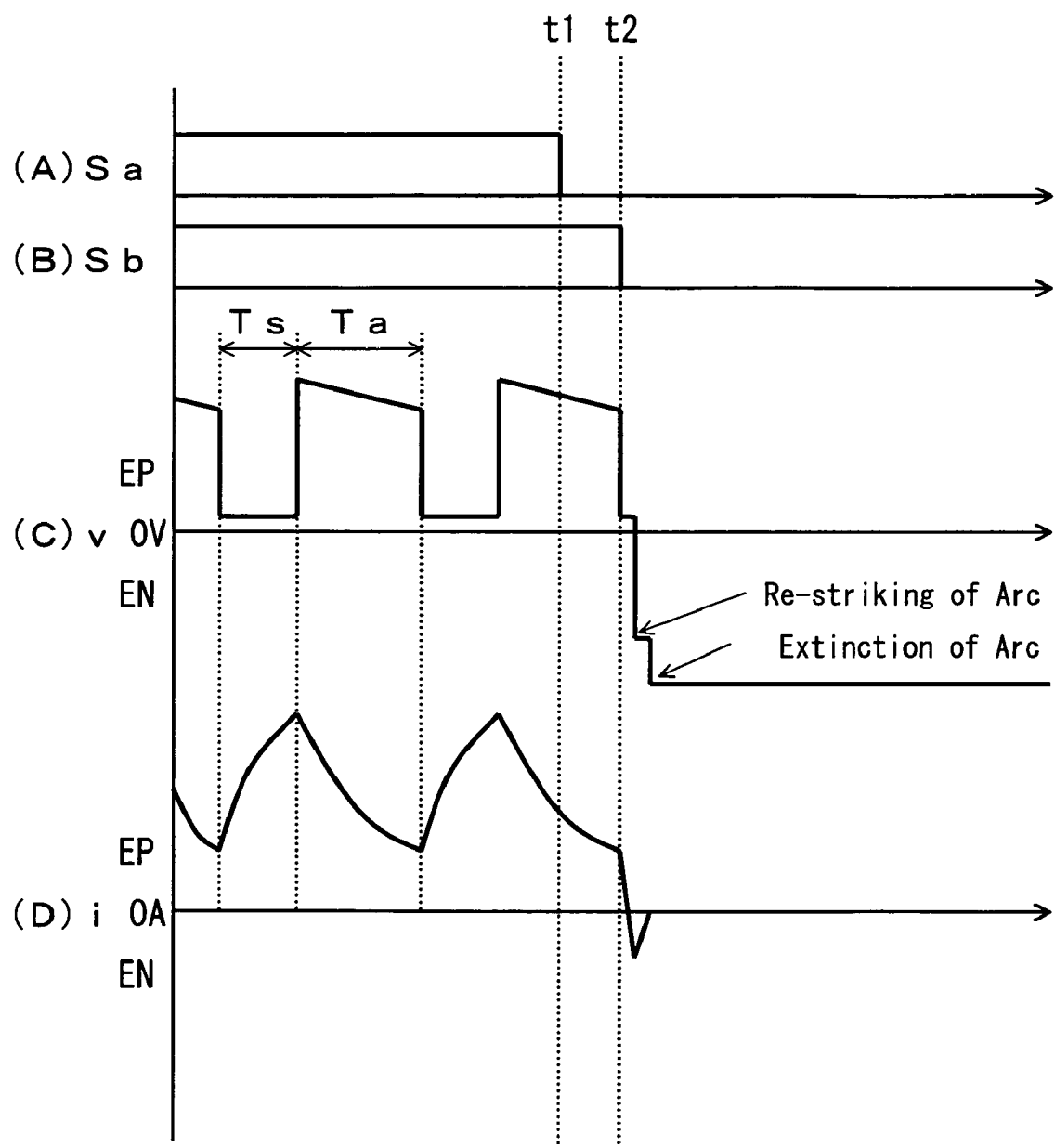
FIG. 6 is a voltage-current waveform chart illustrating a polarity switching short circuiting arc welding method, for describing problems.

FIG. 1 is a voltage-current waveform chart showing a polarity switching short circuiting arc welding method according to a first embodiment of the present invention. Part (A) of the figure shows a polarity switching signal Sa, part (B) of the figure shows a polarity switching start signal Sb, part (C) of the figure shows a welding voltage v which is a voltage between the welding wire and the base metal, and part (D) of the figure shows a welding current i which passes through the arcing/short circuiting load, respectively in the form of time course changes. The figure corresponds to FIG. 5 mentioned above, and the operation before the time t1 is the same. Hereinafter, an operation after the time t1 will be described with reference to FIG. 1.

As shown in part (A) of the figure, when the polarity switching signal Sa changes at a time t1 and then the first short circuiting occurs at the time t2, the polarity switching start signal Sb changes as shown in part (B) of the figure, after a lapse of predetermined short circuit initial period Ti from the moment of short circuiting. During the short circuit initial period Ti, as shown in part (D) of the figure, the welding current i is reduced to a short circuit initial current Ii which is a few tens of amperes. Under this state, as the short circuit initial period Ti has lapsed at the time t3, the polarity switching start signal Sb shown in part (B) of the figure changes, whereupon a polarity switching operation commences. As a result, the welding voltage v shown in part (C) of the figure and the welding current i shown in part (D) of the figure switch from electrode positive polarity EP to electrode negative polarity EN.

In the above, the welding current i is reduced right after the short circuiting and maintained for the short circuit initial period Ti until a short circuit initial state is succeeded by a more reliable short circuiting stage, whereby probability for arc re-striking right after the short circuiting is dramatically reduced. This eliminates arc extinction caused by arc re-striking during polarity switching. Further, since the current value ip at the time of polarity switching is equal to Ii which is a very low value, so the value of surge voltage occurring at the time of polarity switching is also very low.

After the polarity switching at the time t3, the welding current i is increased to open the short circuit. Timing for this current increase may be the time of polarity switching, or may be delayed until the switching state is stabilized.

Figure 2:
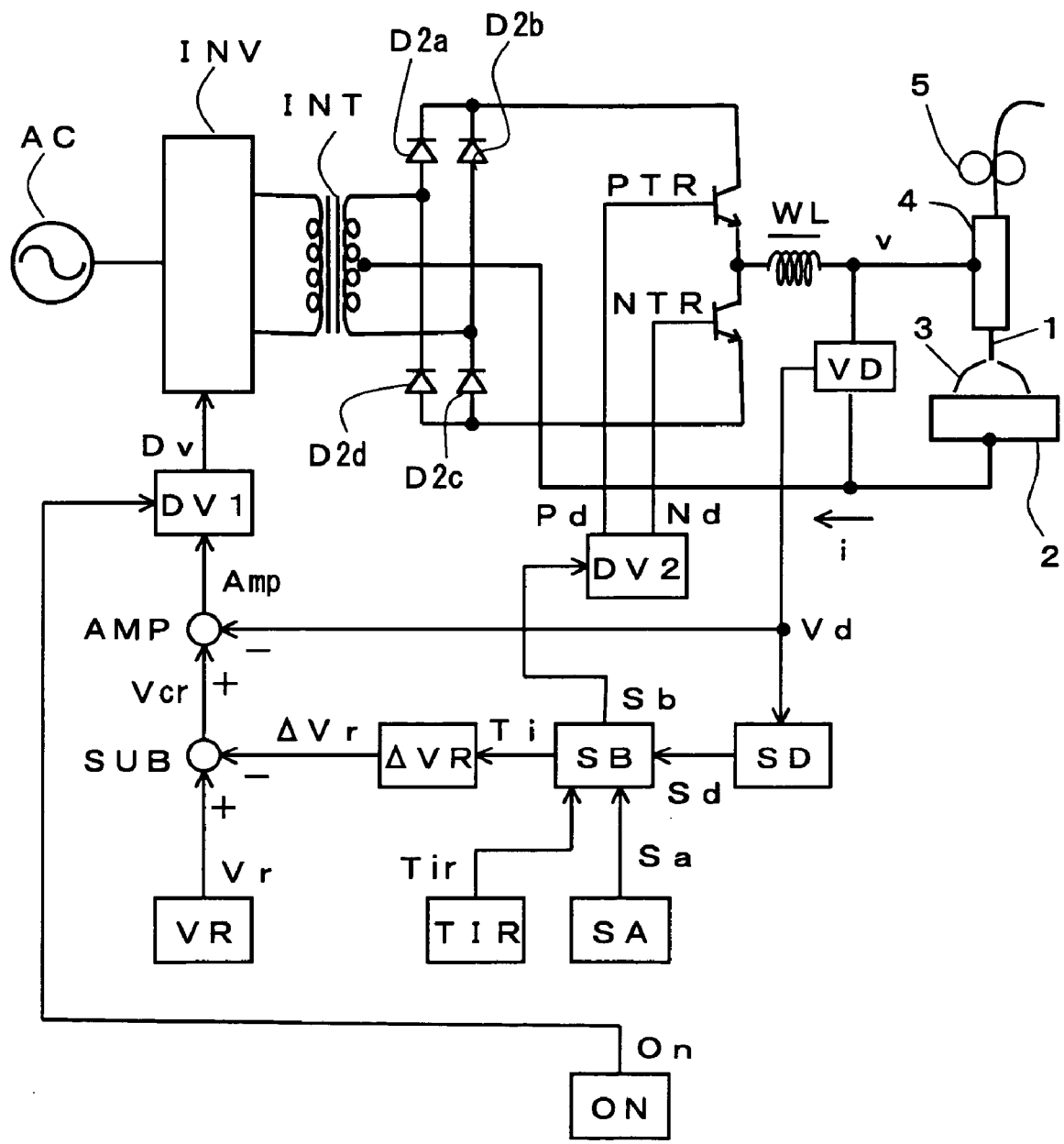
FIG. 2 is a block diagram of a welding power source according to the first embodiment of the present invention.

FIG. 2 is a block diagram of a welding power source for carrying out the above-described polarity switching short circuiting arc welding method according to the first embodiment. Hereinafter, each block will be described with reference to the figure.

An inverter circuit INV receives an input from a commercial alternating-current power source AC (three-phase 200 V, for example), rectifies the input, and outputs a high-frequency alternating current by inverter control in accordance with a drive signal Dv to be described later. A high-frequency transformer INT receives the high-frequency alternating current, and reduces its voltage to a value appropriate to arc welding. The voltage-adjusted high-frequency AC is then rectified by secondary-side diodes D2a-D2d into a direct current. An electrode positive polarity switching element PTR is turned ON/OFF in accordance with an electrode positive polarity drive signal Pd to be described later. When PTR is turned ON, the power source provides electrode positive polarity EP. An electrode negative polarity switching element NTR is turned ON/OFF in accordance with an electrode negative polarity drive signal Nd. When NTR is turned ON, the power source provides electrode negative polarity EN. A reactor WL smoothens the rectified DC which still has some ripples. A welding wire 1 is supplied by feeder rollers 5 of a wire feeder, through a welding torch 4, to generate an arc 3 between the welding wire 1 and a base metal 2.

A voltage detection circuit VD detects a welding voltage v and outputs a voltage detection signal Vd. A short-circuit determination circuit SD checks the value of the voltage detection signal Vd to find a short circuiting stage, and thereupon outputs a High level, short-circuit determination signal Sd. A polarity switching signal circuit SA outputs a polarity switching signal Sa for switching to a polarity suitable to the welding location, etc. A short circuit initial period setting circuit TIR outputs a predetermined short circuit initial period setting signal Tir. A polarity switching start signal generation circuit SB outputs a short circuit initial period signal Ti which keeps High level during a period from the time when the short-circuit determination signal Sd becomes high level (meaning short-circuit state) after the polarity switching signal Sa changes, till the time when the period defined by the short circuit initial period setting signal Tir lapses. Further, a polarity switching start signal generation circuit SB outputs a polarity switching start signal Sb which changes its state upon a lapse of the period defined by the short circuit initial period setting signal Tir. In other words, in the above-described FIG. 1, the short circuit initial period signal Ti keeps High level during a period between the two times t2-t3. A voltage decrease setting circuit ΔVR outputs a voltage decrease setting signal ΔVr which takes a predetermined value while the short circuit initial period signal Ti keeps High level, and a value of zero in the other periods.

A voltage setting circuit VR outputs a predetermined voltage setting signal Vr. A subtraction circuit SUB subtracts the voltage decrease setting signal ΔVr from the voltage setting signal Vr, and thereby outputs a voltage control setting signal Vcr=Vr−ΔVr. This means that the value of the voltage control setting signal Vcr is small during the short circuit initial period. This enables to reduce the welding voltage v, and thereby to reduce the value of welding current i to a small value. An error amplification circuit AMP amplifies an error between the voltage control setting signal Vcr and the voltage detection signal Vd, and outputs an error amplification signal Amp. This circuit gives a voltage-constant characteristic to the welding power source. A welding start circuit ON outputs a welding start signal On which becomes high level at the time to start welding. A primary-side driving circuit DV1 outputs a drive signal Dv for driving the inverter circuit INV in accordance with the error amplification signal Amp while the welding start signal On keeps High level.

A secondary-side driving circuit DV2 outputs the electrode positive polarity drive signal Pd while the polarity switching start signal Sb keeps High level, whereas it outputs the electrode negative polarity drive signal Nd during the Low level period of Sb. The above describes a case in which the welding current i is lowered by lowering the voltage control setting signal Vcr during the short circuit initial period. Alternatively, the welding current i may be lowered by switching the welding power source to a constant-current characteristic and setting a small value to a current setting signal, during the short circuit initial period.

The short circuit initial period is set to an appropriate value in accordance with the output polarity, wire feeding rate, type of welding wire, type of shielding gas and so on, because these factors of welding slightly change the time from the short circuit initial state where the droplet makes contact with the molten pool to a more reliable state of the short circuiting stage established by the molten pool surface tension working on the droplet. For this reason, an optimum value for the time varies depending on welding conditions.

Figure 3:
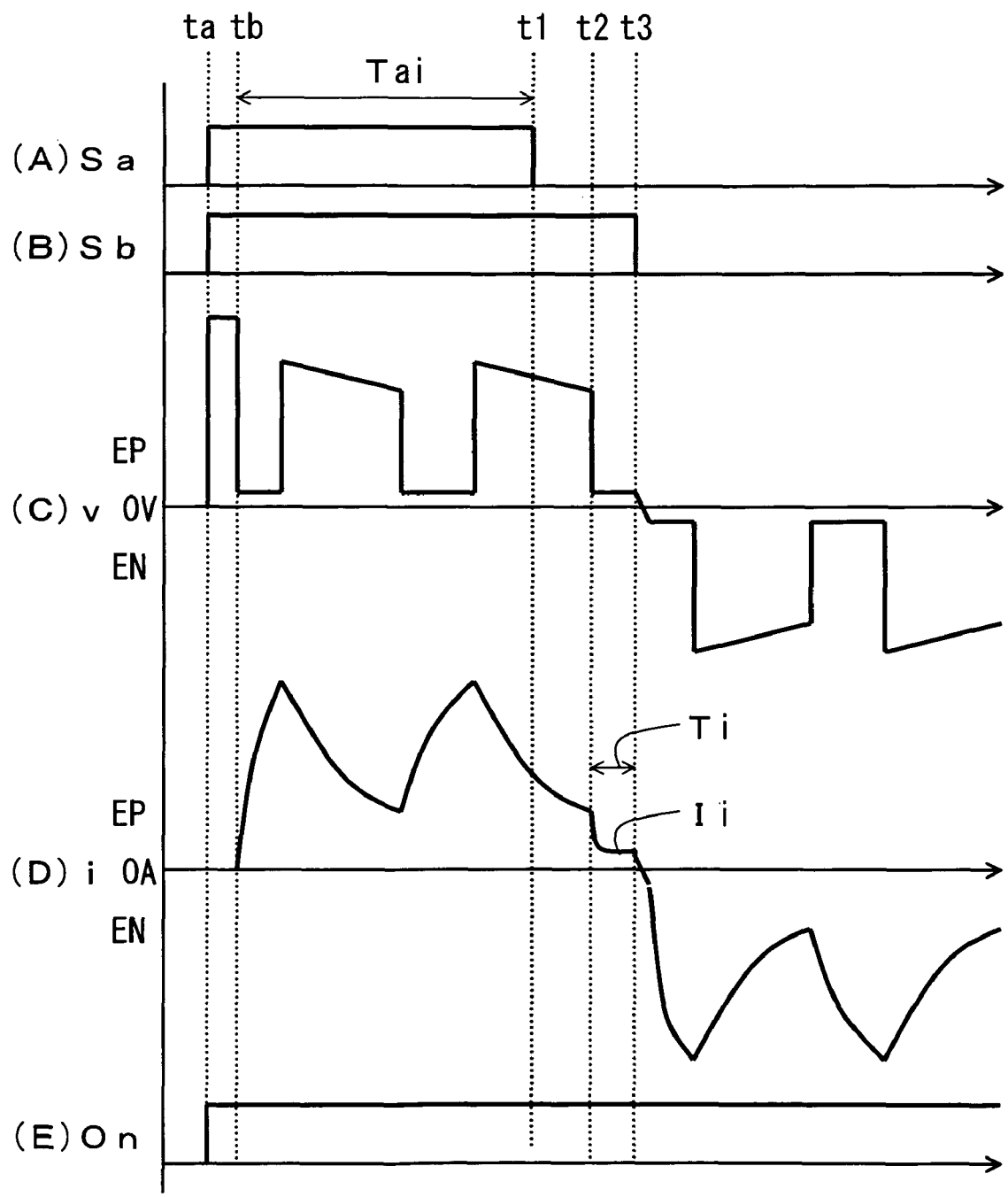
FIG. 3 a voltage-current waveform chart illustrating a polarity switching short circuiting arc welding method according to a second embodiment of the present invention.

FIG. 3 is a voltage-current waveform chart showing a polarity switching short circuiting arc welding method according to a second embodiment of the present invention. Part (A) of the figure shows a polarity switching signal Sa, part (B) of the figure shows a polarity switching start signal Sb, part (C) of the figure shows a welding voltage v, part (D) of the figure shows a welding current i, and part (E) of the figure shows a welding start signal On, respectively in the form of time course changes. The waveform chart shows a time when welding is started. Operations after the time t1, i.e. after a period starting with arc start, till a lapse of a predetermined arc start initial period Tai, are the same as in FIG. 1 described earlier. Hereinafter, operations before the time t1 will be described with reference to FIG. 3.

As shown in part (E) of the figure, the welding start signal On becomes high level (Start Welding) at a time ta, whereupon the welding wire is begun being supplied, and as shown in part (C) of the figure, a welding voltage v is outputted. At a time tb, the welding wire reaches the base metal and makes contact therewith. Then, as shown in part (C) of the figure, the welding voltage v takes a short circuiting voltage value, and as shown in part (D) of the figure, the welding current i begins being applied to start an arc. At the time t1, which is a point when the predetermined arc start initial period Tai has passed, the polarity switching signal Sa changes as shown in part (A) of the figure. Operations thereafter are the same as in FIG. 1, and will not be described here. In the figure, the power source takes electrode positive polarity EP during the arc start initial period Tai whereas it takes electrode negative polarity EN thereafter, but the polarity arrangement may be vice versa. A reason why the polarity switching is made at the time of arc start is that welding quality at the arc start can be better with one polarity than the other, depending on the type of welding wire, type of shielding gas, material of the work, thickness of the material, joints and so on. Therefore, the arc start initial period Tai is set appropriately depending on these welding conditions.

Figure 4:
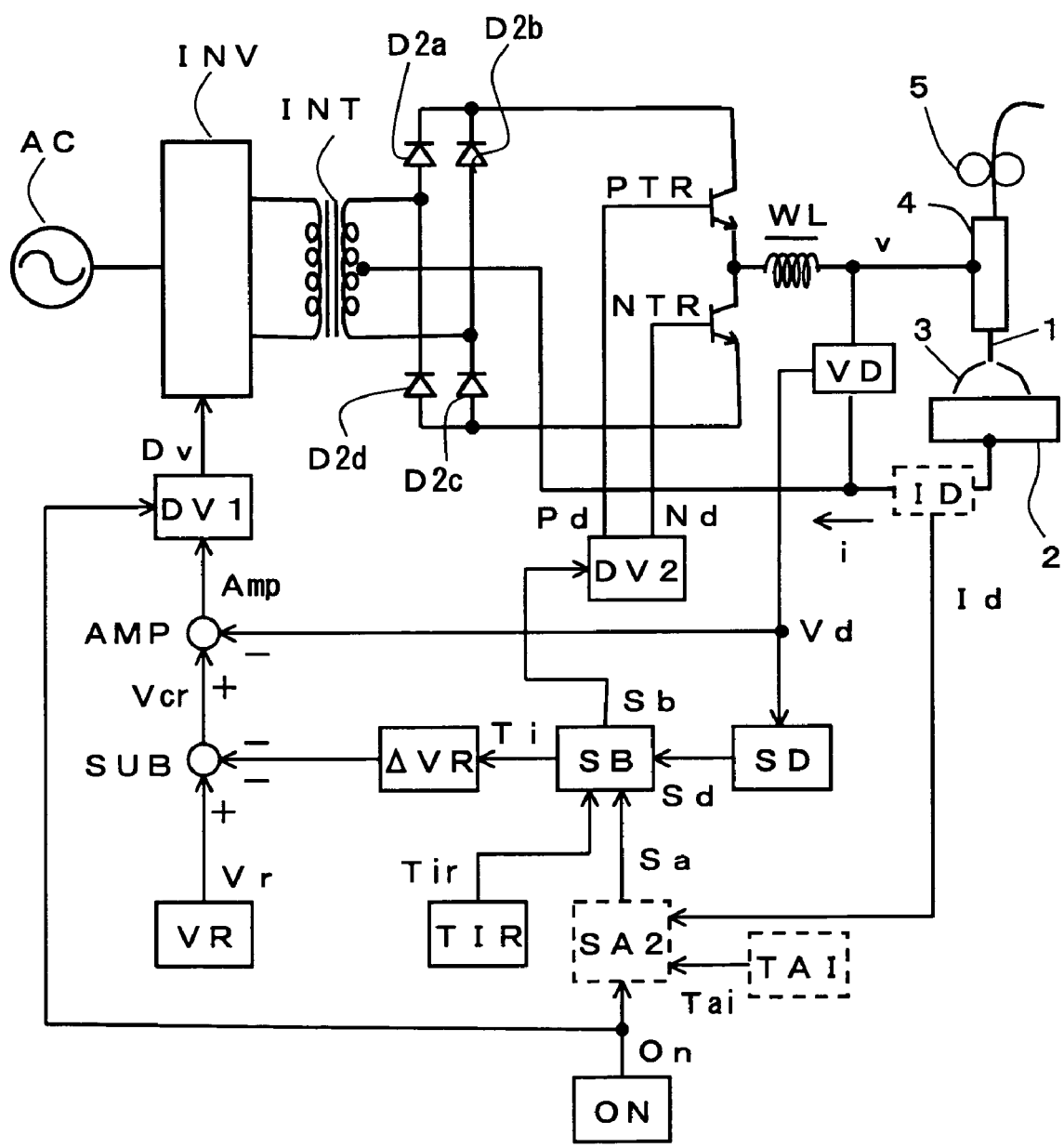
FIG. 4 is a block diagram of a welding power source according to the second embodiment of the present invention.

FIG. 4 is a block diagram of a welding power source for carrying out the above-described polarity switching short circuiting arc welding method according to the second embodiment. Blocks identical with those in FIG. 2 described earlier are indicated by the same reference codes and will not be described here again. Hereinafter, description will be made for the blocks different from those in FIG. 2 or the blocks drawn in broken lines.

A current detection circuit ID outputs a current detection signal Id which becomes high level as the detection circuit identifies application of the welding current i. An arc start initial period setting circuit TAI outputs a predetermined arc start initial period setting signal Tai. A second polarity switching signal circuit SA2 outputs a polarity switching signal Sa which changes its state at the time when the period defined by the arc start initial period setting signal Tai lapses after a time when the welding start signal On becomes high level and the current detection signal Id becomes high level.

The invention claimed is:

1. A method of performing polarity switching short circuiting arc welding, in which a welding wire is fed at a constant feeding rate, in which a state of short circuiting and a state of arcing appear repeatedly between the welding wire and a base metal, and in which output polarity of a welding power source is switched in accordance with a polarity switching signal for performing electrode positive welding and electrode negative welding, the method comprising the steps of:

beginning to supply the welding wire based on a welding start signal;

starting an arc during a predetermined start initial period starting at a time when the supplied welding wire makes contact with the base metal;

reducing a welding current during a predetermined short circuit initial period starting at a time when first short circuiting occurs after the polarity switching signal changes upon lapsing of the start initial period;

changing the output polarity of the welding power source upon lapsing of the short circuit initial period; and increasing the welding current for terminating the first short circuiting;

wherein the polarity switching signal is prevented from changing during the start initial period, and an output of the welding power source has a maximum peak value during a period between a time when the supply of the welding wire is begun and the time when the supplied welding wire makes contact with the base metal.

2. The method according to claim 1, wherein the increasing of the welding current is delayed from the changing of the output polarity for stable polarity switching.

* * * * *